United States Patent
Jo et al.

(10) Patent No.: US 10,621,098 B2
(45) Date of Patent: Apr. 14, 2020

(54) COMPUTING DEVICE AND NON-VOLATILE DUAL IN-LINE MEMORY MODULE THAT EVICT AND PREFETCH DATA WITH RESPECT TO MEMORIES HAVING DIFFERENT OPERATING SPEEDS

(71) Applicant: SAMSUNG ELECTRONICS CO., LTD., Suwon-si, Gyeonggi-Do (KR)

(72) Inventors: In Soon Jo, Hwaseong-si (KR); Sung Yong Seo, Seongnam-si (KR); Joo Young Hwang, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 46 days.

(21) Appl. No.: 15/933,451

(22) Filed: Mar. 23, 2018

(65) Prior Publication Data

US 2019/0129854 A1    May 2, 2019

(30) Foreign Application Priority Data

Nov. 1, 2017    (KR) .......................... 10-2017-0144577

(51) Int. Cl.
| | |
|---|---|
| *G06F 12/00* | (2006.01) |
| *G06F 13/00* | (2006.01) |
| *G06F 12/0862* | (2016.01) |
| *G06F 3/06* | (2006.01) |
| *G06F 9/30* | (2018.01) |

(52) U.S. Cl.
CPC ........ *G06F 12/0862* (2013.01); *G06F 3/0683* (2013.01); *G06F 9/30043* (2013.01); *G06F 9/30047* (2013.01); *G06F 2212/222* (2013.01); *G06F 2212/602* (2013.01); *G06F 2212/6028* (2013.01)

(58) Field of Classification Search
CPC .............. G06F 12/0862; G06F 3/0683; G06F 9/30043; G06F 2212/2228; G06F 2212/602; G06F 2212/6028
See application file for complete search history.

(56) References Cited

U.S. PATENT DOCUMENTS

| | | | |
|---|---|---|---|
| 6,311,260 B1 | 10/2001 | Stone et al. | |
| 7,506,119 B2 * | 3/2009 | Gao ..................... | G06F 12/0888 |
| | | | 711/162 |

(Continued)

*Primary Examiner* — Sean D Rossiter
(74) *Attorney, Agent, or Firm* — Volentine, Whitt & Francos, PLLC

(57) ABSTRACT

A computing device includes a processor and a non-volatile dual in-line memory module (NVDIMM) connected to the processor. The NVDIMM includes a first memory having a first processing speed and a first storage capacity, a second memory having a second processing speed lower than the first processing speed and a second storage capacity larger than the first storage capacity, and a controller that evicts or fetches data between the first memory and the second memory. When the processor recognizes a first situation to evict data or a second situation to prefetch data, the processor transmits a command including first information of a logical address of data associated with the first situation or the second situation, second information of a length of the data associated with the first situation or the second situation, and third information indicating the first situation or the second situation to the NVDIMM.

20 Claims, 19 Drawing Sheets

(56) References Cited

U.S. PATENT DOCUMENTS

| | | | |
|---|---|---|---|
| 7,882,307 B1* | 2/2011 | Wentzlaff | G06F 12/0813 |
| | | | 711/119 |
| 8,032,711 B2 | 10/2011 | Black et al. | |
| 8,775,775 B1 | 7/2014 | Ekambaram et al. | |
| 9,141,670 B2 | 9/2015 | Branscome et al. | |
| 9,196,334 B2 | 11/2015 | Kang et al. | |
| 9,390,018 B2 | 7/2016 | McCauley et al. | |
| 9,418,013 B2 | 8/2016 | Anantaraman et al. | |
| 9,606,926 B2 | 3/2017 | Garg et al. | |
| 9,639,481 B2 | 5/2017 | Jung et al. | |
| 2003/0101307 A1* | 5/2003 | Gemelli | G06F 17/5045 |
| | | | 710/305 |
| 2003/0105926 A1* | 6/2003 | Rodriguez | G06F 12/04 |
| | | | 711/129 |
| 2015/0356125 A1 | 12/2015 | Golander et al. | |
| 2016/0110103 A1 | 4/2016 | Jeong et al. | |
| 2016/0335186 A1* | 11/2016 | Svendsen | G06F 12/126 |
| 2017/0060751 A1 | 3/2017 | Okawara et al. | |
| 2017/0161201 A1 | 6/2017 | Malladi et al. | |
| 2017/0193055 A1* | 7/2017 | Harn | G06F 11/3476 |
| 2017/0199814 A1* | 7/2017 | Molloy | G06F 12/0638 |
| 2018/0089087 A1* | 3/2018 | Chang | G06F 12/0862 |
| 2019/0079877 A1* | 3/2019 | Gaur | G06F 12/126 |
| 2019/0138236 A1* | 5/2019 | Tsai | G06F 3/0604 |

\* cited by examiner

```
void parse (InputStream stream) {
  while (not done) {
    String idName = stream.readToken () ;
    Identifier id = symbolTable.lookup (idName)
    if (id == null) {
      id = new Identifier (idName) ;
      symbolTable.add (idName, id) ;
    }                          C
    else free (idName) ;
    computeOn (id) ;
}}
```

FIG. 6

```
600 void parse (InputStream stream) {
  while (not done) {
    String idName = stream.readToken () ;
    Identifier id = symbolTable.lookup (idName)
    if (id == null) {
      id = new Identifier (idName) ;
      symbolTable.add (idName, id) ;
    }                    ⌐C
    else free (idName) ;
    nvmadvise (i100, 10, UNLOAD) ; ～410
    computeOn (id) ;
}}
```

COMPUTING DEVICE AND NON-VOLATILE DUAL IN-LINE MEMORY MODULE THAT EVICT AND PREFETCH DATA WITH RESPECT TO MEMORIES HAVING DIFFERENT OPERATING SPEEDS

This application claims priority from Korean Patent Application No. 10-2017-0144577 filed on Nov. 1, 2017 in the Korean Intellectual Property Office, the disclosure of which is incorporated herein by reference in its entirety.

BACKGROUND

1. Field of the Disclosure

The present disclosure relates to a computing device and a non-volatile dual in-line memory module (NVDIMM).

2. Description of the Related Art

Memory devices are divided into volatile memory devices and non-volatile memory devices. Although a volatile memory device reads and writes data at high speed, the volatile memory device loses stored data when an external supply of power is interrupted. In contrast, a non-volatile memory device may retain stored data even when external power supply is interrupted. Therefore, a non-volatile memory device is used to store data to be retained irrespective of whether power is supplied thereto.

Recently, applications that require a large-capacity system memory have been spreading. A volatile memory has widely been used as a system memory. Since there is a specific technical limit on increasing integration density of a dynamic random access memory (DRAM), there are many cases in which a storage capacity of a DRAM is quite inadequate to meet requirements of the applications. Accordingly, research has been conducted on meeting the requirements of the applications.

SUMMARY

Aspects of the present disclosure provide a computing device in which a low-speed large-capacity memory and a high-speed small-capacity memory are embedded in a non-volatile dual in-line memory module (NVDIMM) and used as a single system memory to produce the same effects as a high-speed large-capacity memory mounted in the computing device.

Aspects of the present disclosure also provide an NVDIMM in which necessary data is retained in a high-speed small-capacity memory.

Additional aspects of the disclosure will be set forth in part in the description which follows and, in part, will be obvious from the description, or may be learned by practice of the disclosure.

According to an aspect of the present disclosure, there is provided a computing device. The computing device includes a processor and a non-volatile dual in-line memory module (NVDIMM) connected to the processor. The NVDIMM includes: (1) a first memory having a first processing speed and a first storage capacity, (2) a second memory having a second processing speed lower than the first processing speed and a second storage capacity larger than the first storage capacity, and (3) a controller configured to evict or fetch data between the first memory and the second memory. When the processor recognizes a first situation to evict data or a second situation to prefetch data, the processor transmits a command including first information about a logical address of data associated with the first situation or the second situation, second information about a length of the data associated with the first situation or the second situation, and third information indicating the first situation or the second situation to the NVDIMM.

According to another aspect of the present disclosure, there is provided a non-volatile dual in-line memory module (NVDIMM). The NVDIMM includes: (1) a first memory having a first processing speed, a first storage capacity, and a first storage space in which first data is stored; (2) a second memory having a second processing speed lower than the first processing speed, a second storage capacity larger than the first storage capacity, and a second storage space in which second data corresponding to the first data is stored; (3) a controller configured to evict or fetch data between the first memory and the second memory; and (4) a host interface. When the controller receives a first command including first information about a logical address of the first data, second information about a length of the first data, and third information indicating a first situation to evict data through the host interface, the controller checks a management map and checks whether the first data is changed.

According to another aspect of the present disclosure, there is provided an NVDIMM. The NVDIMM includes: (1) a first memory having a first processing speed and a first storage capacity; (2) a second memory having a second processing speed lower than the first processing speed, a second storage capacity larger than the first storage capacity, and a first storage space in which first data is stored; (3) a controller configured to evict or fetch data between the first memory and the second memory; and (4) a host interface. When the controller receives a first command including first information about a logical address of the first data, second information about a length of the first data, and third information indicating a first situation to prefetch the first data through the host interface, the controller fetches the first data and stores the first data in a second storage space included in the first memory.

According to another aspect of the present disclosure, there is provided a memory module having a nonvolatile memory, a cache memory, and a controller. The controller, in response to receiving from an external host a request to prefetch data, copies the data from the nonvolatile memory to the cache memory.

BRIEF DESCRIPTION OF THE DRAWINGS

The above and other aspects and features of the present disclosure will become more apparent by describing embodiments thereof in detail with reference to the attached drawings, in which:

FIG. 5 is a view of an example of a method of inserting a command corresponding to eviction of data or prefetching of data into a code by using a processor of a computing device according to some embodiments of the present disclosure;

FIG. 6 is a view of an example of a method of inserting a command corresponding to eviction of data or prefetching of data into a code by using a processor of a computing device according to some embodiments of the present disclosure;

DETAILED DESCRIPTION OF THE EMBODIMENTS

Hereinafter, a semiconductor device according to some embodiments of the present disclosure will be described with reference to FIGS. 1 to 5.

Figure 1:
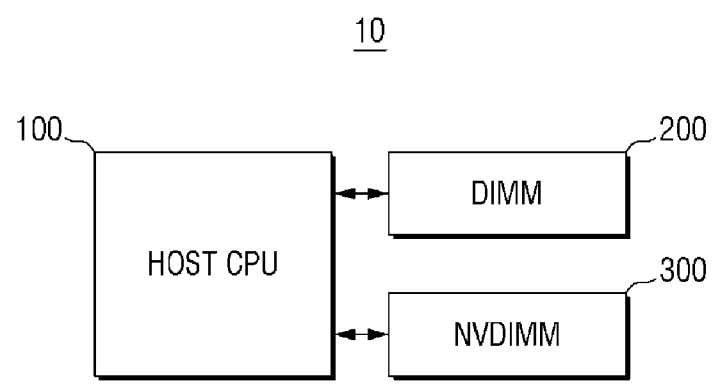
FIG. 1 is a view of an example of a computing device according to some embodiments of the present disclosure.

FIG. 1 is a view of an example of a computing device 10 according to some embodiments of the present disclosure.

Referring to FIG. 1, the computing device 10 may include a processor 100 (HOST CPU), at least one dual in-line memory module 200 (DIMM), and at least one non-volatile dual in-line memory module 300 (NVDIMM). Components shown in FIG. 1 are not indispensable when implementing the computing device 10 and may be greater or fewer in number than the components listed above.

The computing device 10 may be used as any one of various electronic devices included in a computer, a portable computer, an ultra-mobile personal computer (UMPC), a workstation, a data server, a netbook, a web tablet, an electronic book (e-book), a digital camera, a digital audio player, a recorder/player, a digital camera/video recorder/player, a portable game machine, a navigation system, a black box, a three-dimensional (3D) television, a device configured to receive and transmit information in a wireless environment, various electronic devices included in a home network, or various electronic devices included in a computing system.

The processor 100 may be implemented to control overall operations of the computing device 10. In addition, the processor 100 may perform various operations performed in the computing device 10 and process data. The processor 100 may drive an operating system (OS), an application, and a database manager, which are configured to drive the computing device 10.

The processor 100 may be a central processing unit (CPU), a co-processor, an arithmetic processing unit (APU), a graphic processing unit (GPU), or a digital signal processor (DSP).

According to some embodiments, the processor 100 may further include a memory management unit (MMU) configured to manage the DIMM 200 and the NVDIMM 300.

According to some embodiments, the computing device 10 may include only the NVDIMM 300 and not the DIMM 200.

The DIMM 200 may include at least one dynamic random access memory (DRAM).

The NVDIMM 300 may include a first memory having a first processing speed and a first storage capacity and a second memory having a second processing speed lower than the first processing speed and a second storage capacity larger than the first storage capacity. The NVDIMM 300 will be described in more detail below with reference to FIG. 2.

Figure 2:
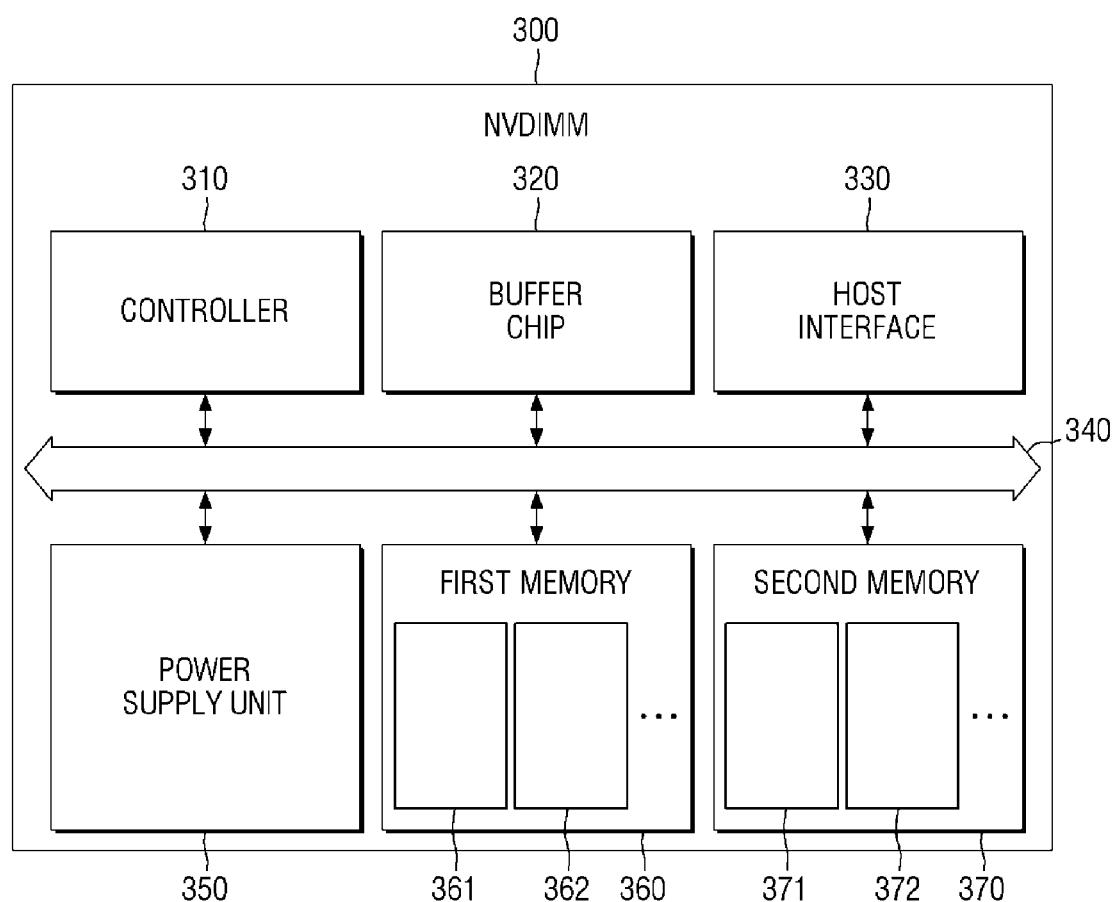
FIG. 2 is a block view of an example of a non-volatile dual in-line memory module (NVDIMM) according to some embodiments of the present disclosure.

FIG. 2 is a block diagram of an example of the NVDIMM 300 according to some embodiments of the present disclosure.

The NVDIMM 300 according to some embodiments may include a controller 310, a buffer chip 320, a host interface 330, a bus 340, a power supply unit 350, a first memory 360, and a second memory 370. Components shown in FIG. 2 are not indispensable when implementing the NVDIMM 300 and may be greater or fewer in number than the components listed above.

The controller 310 may control overall operations of the NVDIMM 300.

According to some embodiments, the controller 310 may receive a command for controlling the first memory 360 and the second memory 370 through the host interface 330. When the above-described command is received, the controller 310 may serve to move data between the first memory 360 and the second memory 370. That is, when the above-described command is received, the controller 310 may serve to evict or fetch data between the first memory 360 and the second memory 370.

In an example, when a first command corresponding to prefetching of data is received, the controller 310 may fetch data stored in the second memory 370 to the first memory 360 and store the data in the first memory 360.

In another example, when a second command corresponding to eviction of data is received, the controller 310 may determine whether the data stored in the first memory 360 is changed on the basis of a management map of the first memory 360. When the data stored in the first memory 360 is changed, the controller 310 may evict the data stored in the first memory 360 to the second memory 370 and store the data in the second memory 370.

The buffer chip 320 may temporarily store data to be stored in the NVDIMM 300 or data to be read from the NVDIMM 300.

The host interface 330 may provide an interface between the processor 100 (see FIG. 1) of the computing device and the NVDIMM 300.

The controller 310 may receive commands, data, and signals from the processor 100 of the computing device through the host interface 330. Furthermore, the controller 310 may transmit commands, data, and signals to a host through the host interface 330.

The power supply unit 350 may supply power to each component included in the NVDIMM 300 under the control of the controller 310. The power supply unit 350 may include a battery. Here, the battery may be an embedded battery or a replaceable battery.

According to some embodiments, in a situation in which power is not supplied from the outside, the controller 310 may control the power supply unit 350. The power supply unit 350 may supply power to each of the components included in the NVDIMM 300 under the control of the controller 310. While power is being supplied through the power supply unit 350, the controller 310 may evict data stored in a volatile memory to a non-volatile memory and store the data in the non-volatile memory. Accordingly, when the supply of power is abruptly interrupted, the data stored in the volatile memory may be prevented from being lost.

The controller 310, the buffer chip 320, the host interface 330, the power supply unit 350, the first memory 360, and the second memory 370 may transceive data between each other via the bus 340.

The first memory 360 may be a memory having a first processing speed and a first storage capacity. Here, the first memory 360 may include a plurality of memory chips 361, 362, . . . having the first processing speed.

The second memory 370 may be a memory having a second processing speed lower than the first processing speed and a second storage capacity larger than the first storage capacity. Here, the second memory 370 may include a plurality of memory chips 371, 372, . . . having the second processing speed.

The first memory 360 may be a volatile memory. For example, the first memory 360 may be implemented as a RAM, a static RAM (SRAM), a dynamic RAM (DRAM), a synchronous DRAM (SDRAM), a thyristor RAM (T-RAM), a zero-capacitor RAM (Z-RAM), a twin-transistor RAM (TTRAM), or one of various combinations thereof.

The second memory 370 may be a non-volatile memory. For example, the second memory 370 may be implemented as an electrically erasable programmable read-only memory (EEPROM), a flash memory, a magnetic RAM (MRAM), a spin-transfer torque MRAM, a ferroelectric RAM (Fe-RAM), a phase-change RAM (PRAM), a resistive RAM (RRAM), a multimedia card (MMC), an embedded MMC (eMMC), a universal flash storage (UFS), or one of various combinations thereof.

According to some embodiments, the first memory 360 may be a non-volatile memory. However, even when the first memory 360 is the non-volatile memory, a processing speed of the first memory 360 may be higher than a processing speed of the second memory 370, and a storage capacity of the first memory 360 is smaller than a storage capacity of the second memory 370.

For example, when the first memory 360 includes a plurality of PRAM chips, the second memory 370 may include a plurality of flash memory chips. In this case, the total storage capacity of the plurality of PRAM chips may be smaller than the total storage capacity of the plurality of flash memory chips.

Figure 3:
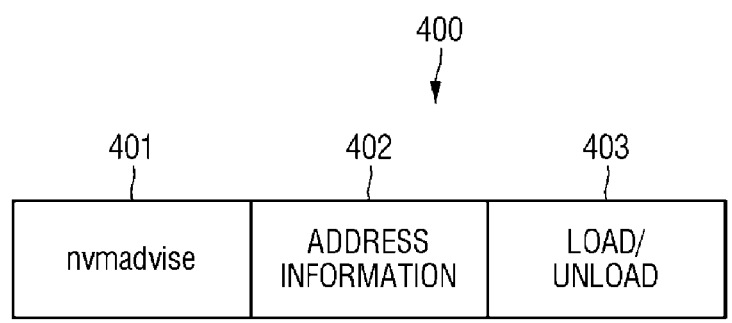
FIG. 3 is a view of an example of a command generated by a processor of a computing device according to some embodiments of the present disclosure.
Figure 4:
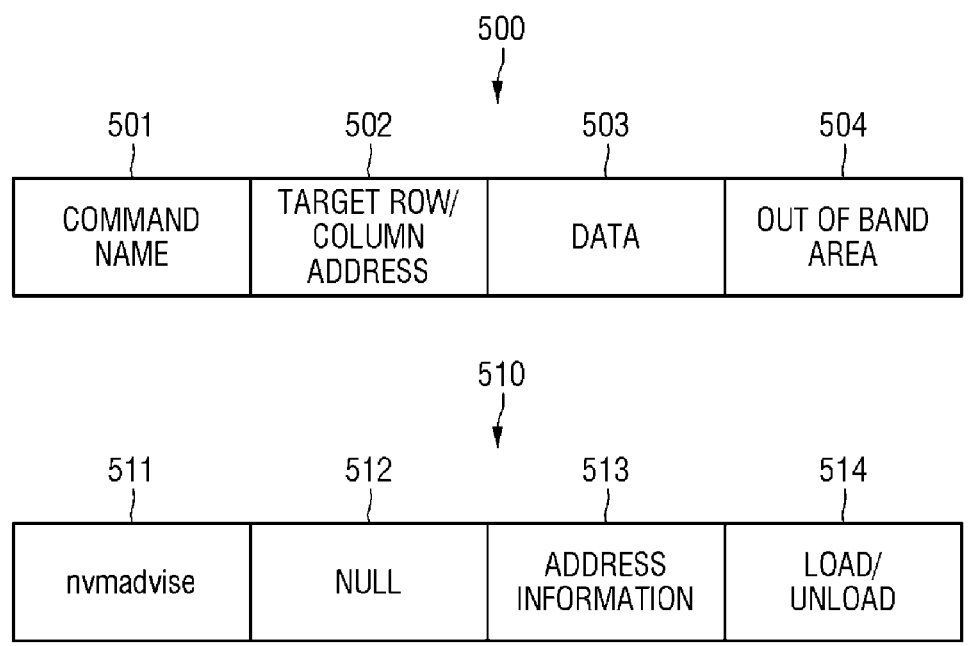
FIG. 4 is a view of another example of a command generated by a processor of a computing device according to some embodiments of the present disclosure.

FIG. 3 is a view of an example of a command generated by a processor of a computing device according to some embodiments of the present disclosure. FIG. 4 is a view of another example of the command generated by the processor of the computing device according to some embodiments of the present disclosure.

When the processor 100 (see FIG. 1) included in the computing device recognizes a first situation that requires eviction of data or a second situation that requires prefetching of data, the processor 100 may transmit a command 400 (see FIG. 3) corresponding to the first situation or the second situation to an NVDIMM.

Referring to FIG. 3, the command 400 may include, for example, three fields. Here, a field may refer to an area including specific information in a command.

A first field 401 may include a command name. For example, a name of a command to evict data or prefetch data may be "nvmadvise".

A second field 402 may include information about a logical address of data.

For example, the second field 402 may include a logical address of data to be prefetched or evicted. For example, the second field 402 may include information about the logical address of the data to be evicted or prefetched and information about a length of the data to be evicted or prefetched.

In another example, when there is a plurality of discontinuous logical addresses of data to be evicted or prefetched, the second field 402 may include information about the logical address of each of a plurality of data. For example, the second field 402 may include a list of the information about the logical address of each of the plurality of data and information about a length of the data corresponding to each of the logical addresses. In this case, the plurality of data may be prefetched or evicted in response to one command without it being necessary to invoke a plurality of commands for the data, and thus a processing speed may increase.

A third field 403 may include information indicating the situation that requires the eviction of data or the situation that requires the prefetching of data.

In an example, the third field 403 may include UNLOAD in the situation that requires the eviction of data. In another example, the third field 403 may include LOAD in the situation that requires the prefetching of data. That is, UNLOAD may indicate the situation that requires the eviction of data, while LOAD may indicate the situation that requires the prefetching of data.

Although FIG. 3 illustrates a typical case in which the above-described command 400 is used as a prefetch command or an eviction command, in some other embodiments, a command having a structure similar to a write command 500 (see FIG. 4) used for a DRAM may be used as the prefetch command or the eviction command. That is, when the processor 100 (see FIG. 1) included in the computing device recognizes the first situation that requires the eviction of data or the second situation that requires the prefetching of data, the processor 100 may transmit a command 510 (see FIG. 4), which is different from the command 400 described above with reference to FIG. 3, to the NVDIMM.

Referring to FIG. 4, a first field 501 included in the write command 500 used for the DRAM may include a command name. A second field 502 included in the write command 500 may include information (e.g., a row address and a column address) about an address of a storage space in which data is to be stored. A third field 503 included in the write command 500 may include data to be written. A fourth field 504 included in the write command 500 may be an out-of-band (00B) area.

A first field 511 included in the command 510 corresponding to the first situation or the second situation may include a command name. For example, a name of a command to evict data or prefetch data may be "nvmadvise".

A second field 512 included in the command 510 may include dummy information NULL. When the write command 500 is used on a DRAM, although the second field 502 of the write command 500 may include the information about an address of a storage space in which data is to be stored, the NVDIMM may have an address of a storage space, which is different from that of the DRAM.

A third field 513 included in the command 510 may include information about an area in which data is stored.

For example, the third field 513 may include information about a logical address of data to be evicted or prefetched and information about a length of the data.

In another example, when there is a plurality of discontinuous logical addresses of data to be evicted or prefetched, the third field 513 may include a list of information about the logical address of each of a plurality of data and information about a length of the data corresponding to each of the logical addresses. In this case, the plurality of data may be prefetched or evicted in response to one command without it being necessary to invoke a plurality of commands for the data, and thus a processing speed may increase.

A fourth field 514 included in the command 510 may include information indicating the situation that requires the eviction of data or the situation that requires the prefetching of data.

In an example, the fourth field 514 may include UNLOAD in the situation that requires the eviction of data. In another example, the fourth field 514 may include LOAD in the situation that requires the prefetching of data.

FIGS. 5 and 6 are views of examples of a method of inserting a command corresponding to eviction of data or prefetching of data into a code by using a processor of a computing device according to some embodiments of the present disclosure.

The processor 100 (see FIG. 1) of the computing device may further include a compiler configured to analyze a code and insert a command into the code.

The complier may analyze the code and recognize a situation that requires eviction of data or a situation that requires prefetching of data.

For example, referring to FIG. 5, the compiler may recognize a command C associated with a memory release, for example, free(idName), in a code 600. In this case, the complier may recognize the situation that requires the eviction of data.

Referring to FIG. 6, when the complier recognizes the situation that requires the eviction of data, the complier may insert a command 410 corresponding to eviction into the code 600. Here, the command 410 corresponding to the eviction may be inserted into the code 600 after the command C associated with the release of memory.

For instance, a first field included in the command 410 corresponding to the eviction may include "nvmadvise" as a command name, a second field included in the command 410 may include information indicating that a start address is "100" and a data length is "10", and a third field included in the command 410 may include UNLOAD indicating the situation that requires the eviction of data.

Although only the eviction of data has been described with reference to FIG. 5, the present disclosure is not limited thereto. When the complier analyzes the code and recognizes the situation that requires the prefetching of data, the complier may insert the command corresponding to the prefetching of data into the code.

Meanwhile, although not shown, according to some embodiments, the processor 100 (see FIG. 1) of the computing device may intercept a system call. Here, the intercepted system call may be a system call for transmitting information on a storage area of a memory to an OS. For example, an madvise command and an fadvise command may correspond to system calls. Here, the madvise command is a system call for informing the OS of a plan for use of a memory area in the form of int madvise(void*addr, size_t length, int advise), and the fadvise command is a system call for informing the OS of a plan for use of a file area, like the madvise command.

When the intercepted system call is a command associated with eviction of data, the processor 100 (see FIG. 1) may convert the command associated with the eviction of data into the command 400 or 510 described above with reference to FIG. 3 or 4. Further, when the intercepted system call is a command associated with prefetching of data, the processor 100 (see FIG. 1) may convert the command associated with the prefetching of data into the command 400 or 510 described above with reference to FIG. 3 or 4.

For example, assuming that the system call intercepted by the processor 100 (see FIG. 1) is the madvise command, a third parameter(int advise) of the madvise command may include information MADV_WILLNEED indicating that a memory area defined by a first parameter(void*addr) and a second parameter(size_t length) will be used soon, or information MADV_DONTNEED indicating that the memory area will no longer be used. Accordingly, when the processor 100 (see FIG. 1) confirms that the third parameter of the madvise command includes the information MADV_WILL-NEED, the processor 100 may recognize a situation that requires prefetching of data and convert the madvise command into an nvmadvise command including the third field 403 (see FIG. 3) which includes LOAD. On the other hand, when the processor 100 confirms that the third parameter of the madvise command includes the information MADV_DONTNEED, the processor 100 may recognize a situation that requires the eviction of data and convert the madvise command into a numadvise command of which the third field 403 (see FIG. 3) includes UNLOAD.

Figure 7:
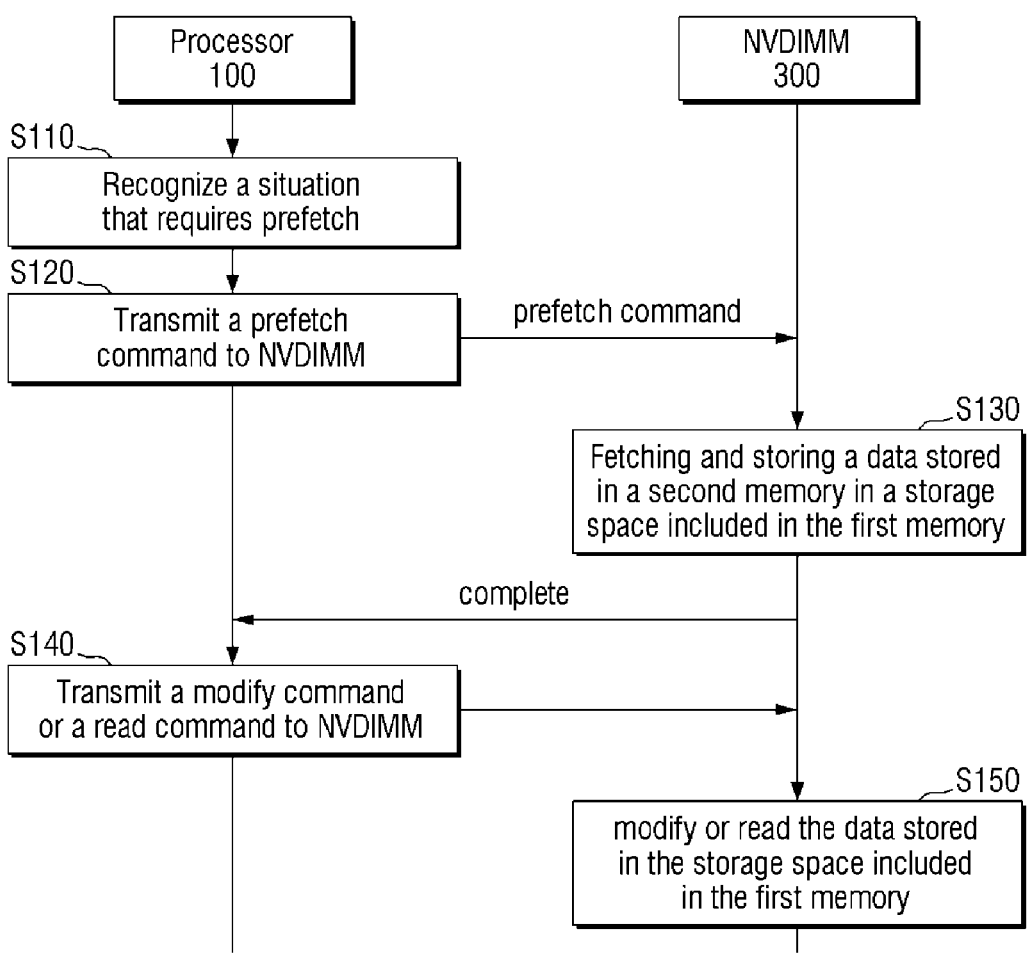
FIG. 7 is a flowchart of an example of a method of prefetching data stored in an NVDIMM in a computing device according to some embodiments of the present disclosure.
Figure 8:
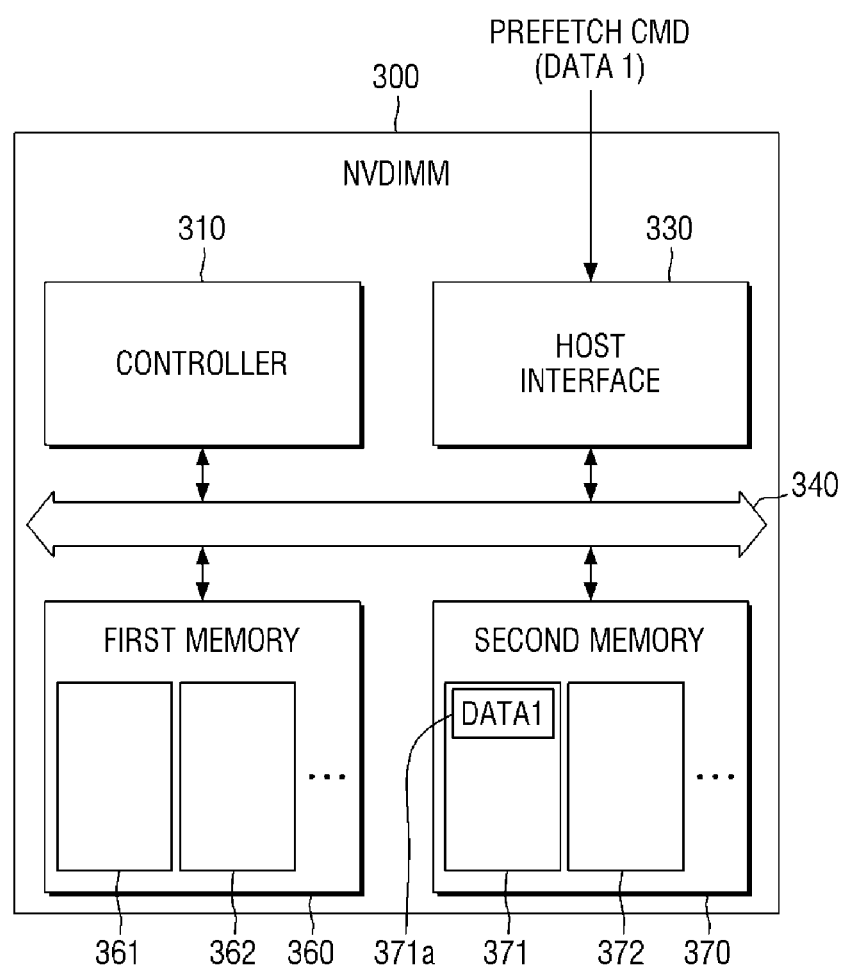
FIG. 8 is a view of an example of a method of prefetching data stored in an NVDIMM in a computing device according to some embodiments of the present disclosure.
Figure 9:
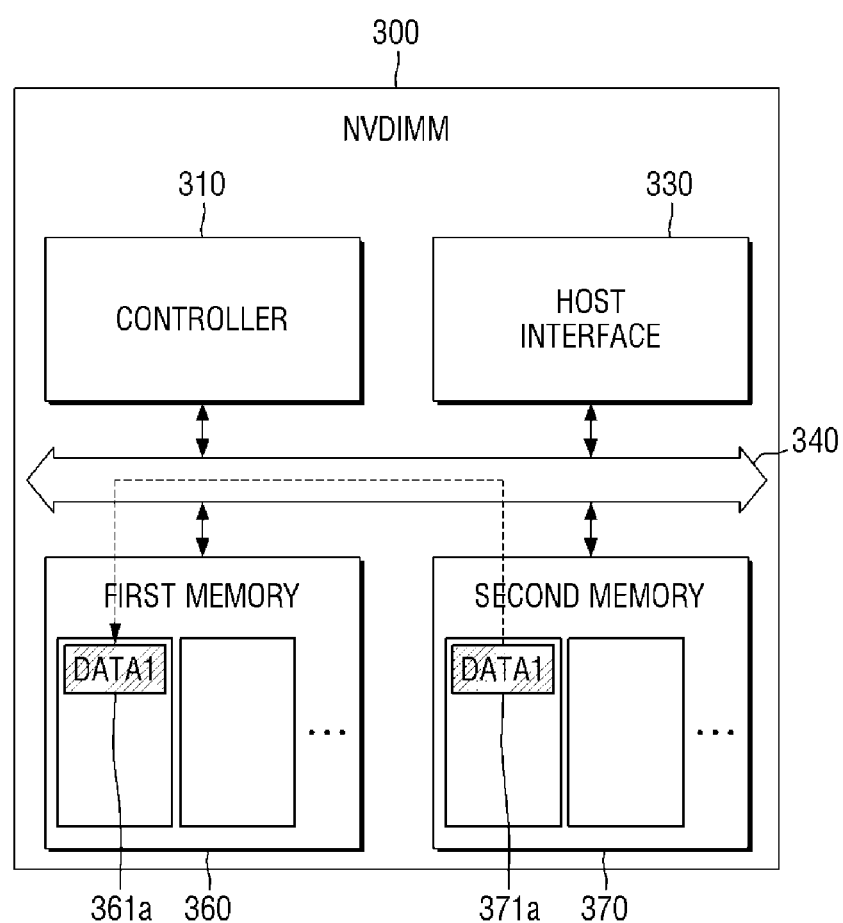
FIG. 9 is a view of an example of a method of prefetching data stored in an NVDIMM in a computing device according to some embodiments of the present disclosure.
Figure 10:
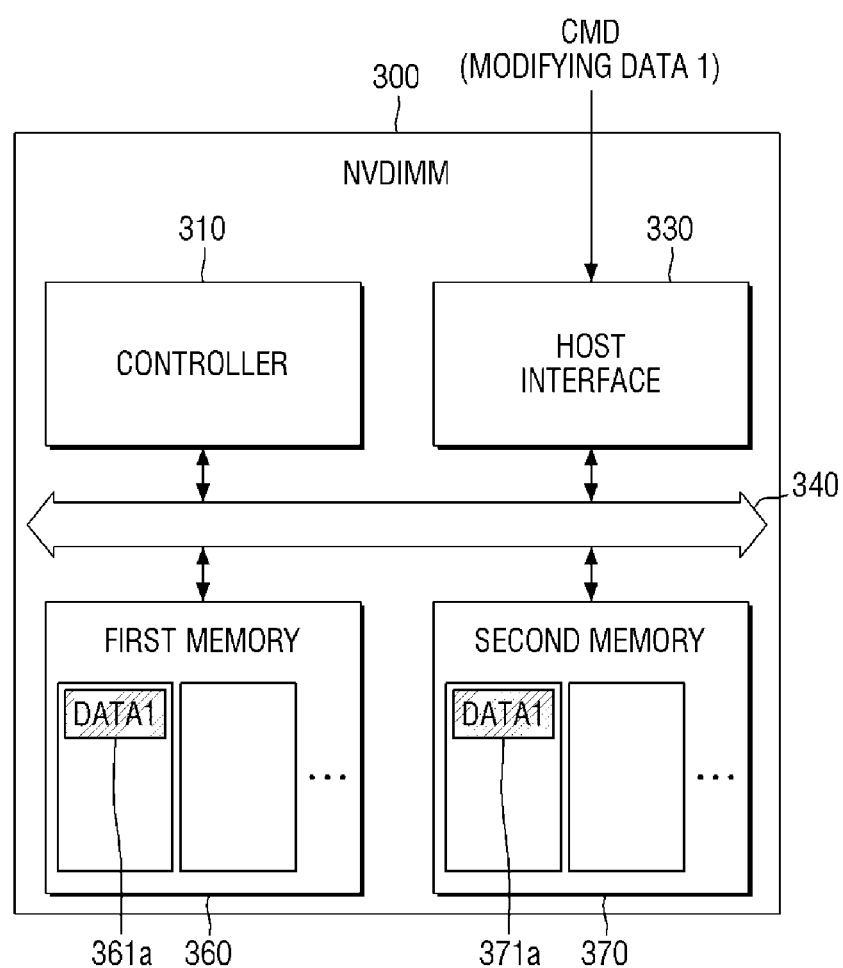
FIG. 10 is a view of an example of a method of modifying first data when a modification command to modify the first data is received in a state in which the first data is prefetched to a first memory according to some embodiments of the present disclosure.
Figure 11:
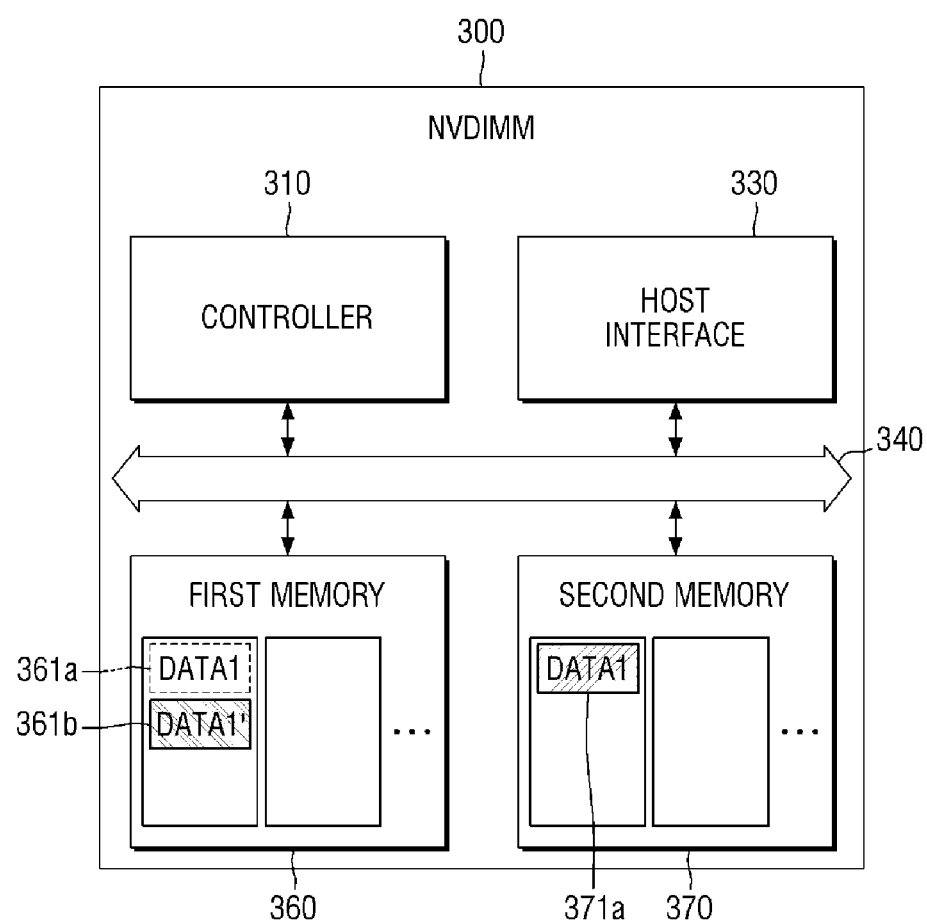
FIG. 11 is a view of an example of a method of modifying first data when a modification command to modify the first data is received in a state in which the first data is prefetched to a first memory according to some embodiments of the present disclosure.
Figure 12:
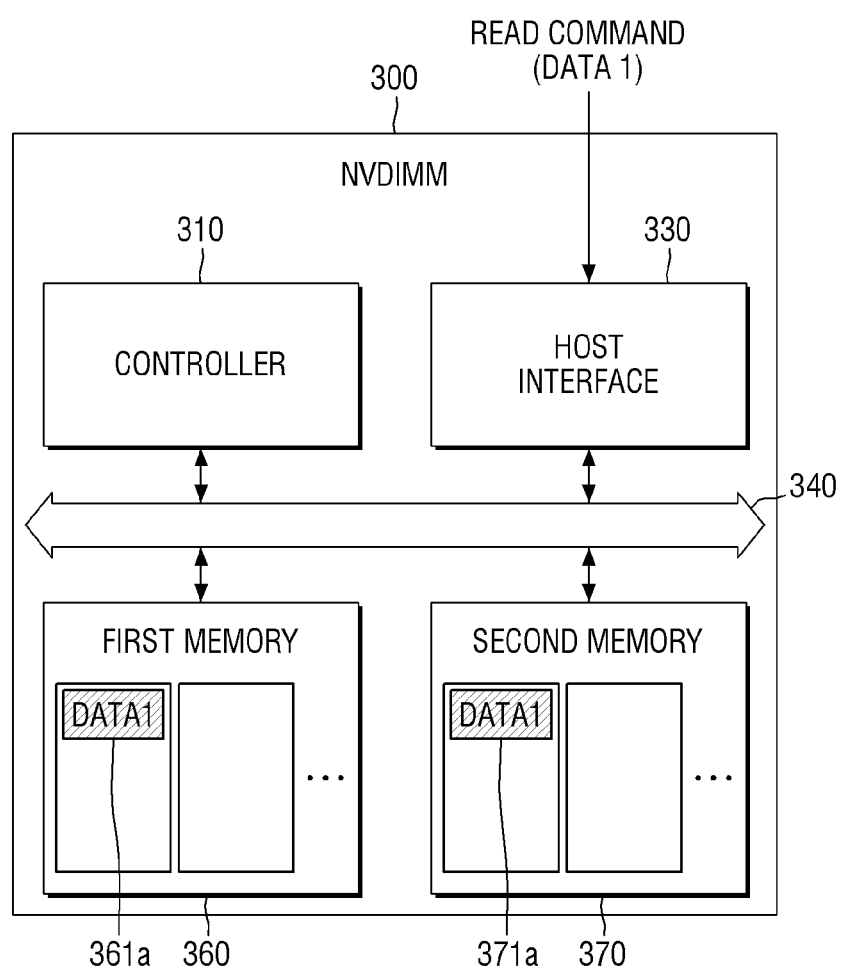
FIG. 12 is a view of an example of a method of reading first data when a read command to read the first data is received in a state in which the first data is prefetched to a first memory according to some embodiments of the present disclosure.
Figure 13:
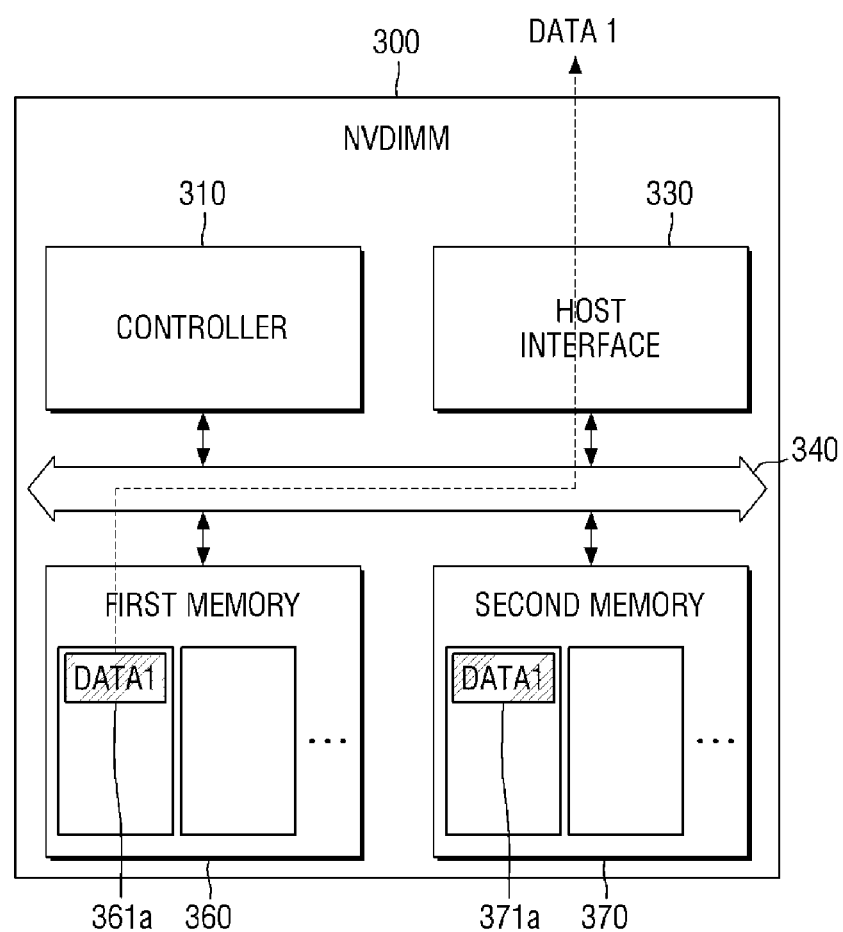
FIG. 13 is a view of an example of a method of reading first data when a read command to read the first data is received in a state in which the first data is prefetched to a first memory according to some embodiments of the present disclosure.

FIG. 7 is a flowchart of an example of a method of prefetching data stored in an NVDIMM in a computing device according to some embodiments of the present disclosure. FIGS. 8 and 9 are views of examples of a method of prefetching data stored in an NVDIMM in a computing device according to some embodiments of the present disclosure. FIGS. 10 and 11 are views of examples of a method of modifying first data when a modification command to modify the first data is received in a state in which the first data is prefetched to a first memory according to some embodiments of the present disclosure. FIGS. 12 and 13 are views of examples of a method of reading first data when a read command to read the first data is received in a state in which the first data is prefetched to a first memory according to some embodiments of the present disclosure.

Referring to FIG. 7, the processor 100 may recognize a situation that requires prefetching of data (S110). Here, prefetching may refer to previously fetching data stored in a second memory having a relatively low processing speed among a first memory and the second memory, which is included in the NVDIMM 300, to the first memory having a relatively high processing speed and storing the data in the first memory.

In an example, the situation that requires the prefetching of data may be explicitly defined in a process or thread of an executed application.

In another example, the processor 100 may recognize a situation that requires prefetching of data by intercepting and analyzing a system call. Since the process has been described above in detail with reference to FIGS. 5 and 6, a detailed description thereof will be omitted.

When the processor 100 recognizes the situation that requires the prefetching of data (S110), the processor 100 may transmit a prefetch command to the NVDIMM 300 (S120). Here, the prefetch command may be a command including first information about a logical address of data to be prefetched, second information about a length of the data to be prefetched, and third information indicating a prefetch situation in the NVDIMM 300. Since the prefetch command has been described in detail above with reference to FIGS. 3 or FIG. 4, a detailed description thereof will be omitted.

When the controller 310 (see FIG. 2) of the NVDIMM 300 receives the prefetch command, data to be prefetched that is stored in the second memory 370 (see FIG. 3) may be fetched to and stored in a storage space included in the first memory 360 (see FIG. 2) (S130).

For example, referring to FIG. 8, the controller 310 of the NVDIMM 300 may receive a prefetch command for first data data1 through the host interface 330. Here, the first data data1 may be data stored in a first storage space 371a of the second memory 370 having the second processing speed lower than the first processing speed of the first memory 360 and the second storage capacity larger than the first storage capacity of the first memory 360.

Referring to FIG. 9, when the prefetch command for the first data data1 is received through the host interface 330, the controller 310 may recognize the first storage space 371a of the second memory 370 based on first information and second information included in the prefetch command. Further, the controller 310 may fetch the first data data1 stored in the first storage space 371a of the second memory 370 to the first memory 360 and store the first data data1 in the second storage space 361a of the first memory 360. When the first data data1 is stored in the second storage space 361a, the controller 310 may also store information indicating that spaces in which the first data data1 is stored are the first storage space 371a and the second storage space 361a.

Referring back to FIG. 7, when the prefetching of the first data data1 is completed, the NVDIMM 300 may transmit a signal indicating the completion of the prefetch to the processor 100 via the host interface 330. The processor 100 may receive the signal and recognize that the prefetching of the first data data1 has been completed.

According to some embodiments, when data is to be modified or read, the processor 100 may transmit a modification command or a read command to the NVDIMM 300 (S140). When the modification command or the read command is received, the NVDIMM 300 may modify or read data that is prefetched to the first memory 360 (see FIG. 2) having a relatively high processing speed (S150).

Hereinafter, a method of modifying data in response to a modification command will be described with reference to FIGS. 10 and 11, and a method of reading data in response to a read command will be described with reference to FIGS. 12 and 13.

Referring to FIG. 10, a controller 310 of an NVDIMM 300 may receive a command to modify first data data1 through a host interface 330. When the command to modify the first data data1 is received through the host interface 330, the controller 310 may modify the first data data1 stored in a second storage space 361a of a first memory 360.

In an example, referring to FIG. 11, when the controller 310 receives a command to modify the first data data1, modified data data1' may be stored in a third storage space 361b, which is new and different from the second storage space 361a of the first memory 360. Further, the controller 310 may store information indicating that the first data data1 is modified and the modified first data data1' is stored in the third storage space 361b in a management map. Here, the management map may be a map configured to manage information about a physical address retrieved due to a logical address and information indicating whether data is changed.

In another example, although not shown, when the controller 310 receives a command to modify the first data data1, the controller 310 may store the modified first data data1' in the existing second storage space 361a of the first memory 360. Further, the controller 310 may store information indicating that the first data data1 is changed and the modified first data data1 is stored in the second storage space 361a in the management map.

As described above, when a modification command is received after data to be modified is prefetched to the first memory 360 having a high processing speed, the first data data1 stored in the first memory 360 having the high processing speed, not the first data data1 stored in the second memory 370 having the low processing speed, may be modified. Thus, a user may feel as if he or she were using a high-speed and large-capacity memory.

Although not shown, when a command to read the first data data1 is received through the host interface 330 after the modification of the first data data1 is completed, the controller 310 may transmit the modified first data data1' of the first memory 360 through the host interface 330.

According to some embodiments, the modified first data data1' stored in the first memory 360 may not be stored in the second memory 370 unless an eviction command is received through the host interface 330.

Referring to FIG. 12, the controller 310 of the NVDIMM 300 may receive a command to read the first data data1 through the host interface 330.

Referring to FIG. 13, when the command to read the first data data1 is received through the host interface 330, the controller 310 may transmit the prefetched first data data1 in the second storage space 361a of the first memory 360. That is, the controller 310 may transmit the first data data1 stored in the first memory 360 having a relatively high processing speed, not the first data data1 stored in the second memory 370 having a relatively low processing speed. Thus, a user may feel as if he or she were using a high-speed and large-capacity memory.

Figure 14:
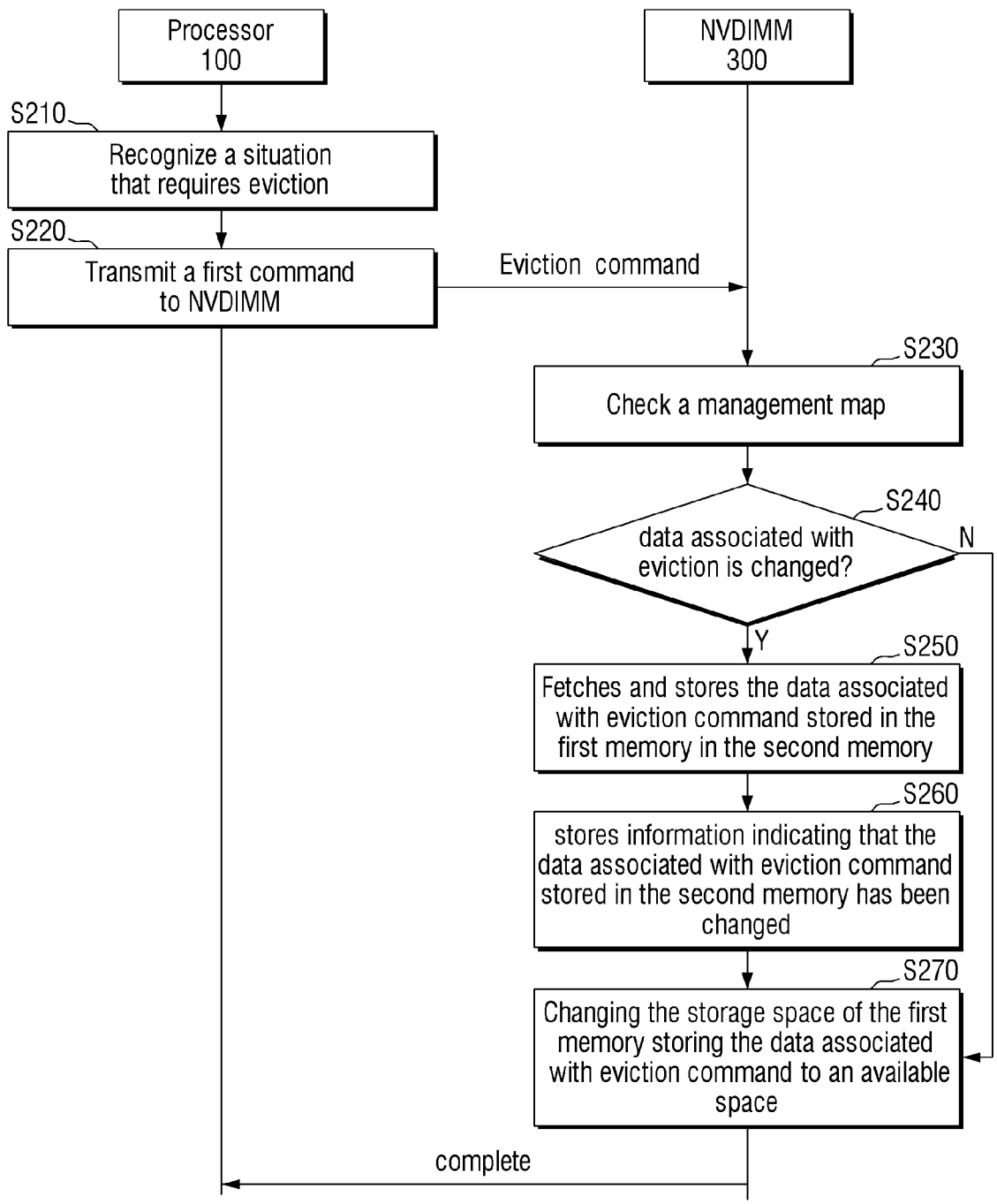
FIG. 14 is a flowchart of an example of a method of evicting data stored in an NVDIMM in a computing device according to some embodiments of the present disclosure.

FIG. 14 is a flowchart of an example of a method of evicting data stored in an NVDIMM in a computing device according to some embodiments of the present disclosure. FIGS. 15 to 19 are views of examples of a method of evicting data stored in an NVDIMM in a computing device according to some embodiments of the present disclosure.

Referring to FIG. 14, the processor 100 may recognize a situation that requires eviction of data (S210). Herein the eviction of data may refer to evicting and storing updated data stored in a first memory having a relatively high processing speed among the first memory and a second memory, which is included in the NVDIMM, in the second memory.

In an example, the situation that requires the eviction of data may be explicitly defined in a process or thread of an executed application.

In another example, the processor 100 may recognize a situation that requires the eviction of data by intercepting and analyzing a system call.

When the situation that requires the eviction of data is recognized (S210), the processor 100 may transmit an eviction command to the NVDIMM 300 (S220). Here, the eviction command may be a command including first information about a logical address of data to be evicted in the NVDIMM 300, second information about a length of the data to be evicted, and third information indicating an eviction situation.

When the eviction command is received, the NVDIMM 300 may check data associated with the eviction command via a management map (S230). Here, the management map may be a map configured to manage information about a physical address retrieved due to a logical address and information indicating whether data is changed.

Figure 15:
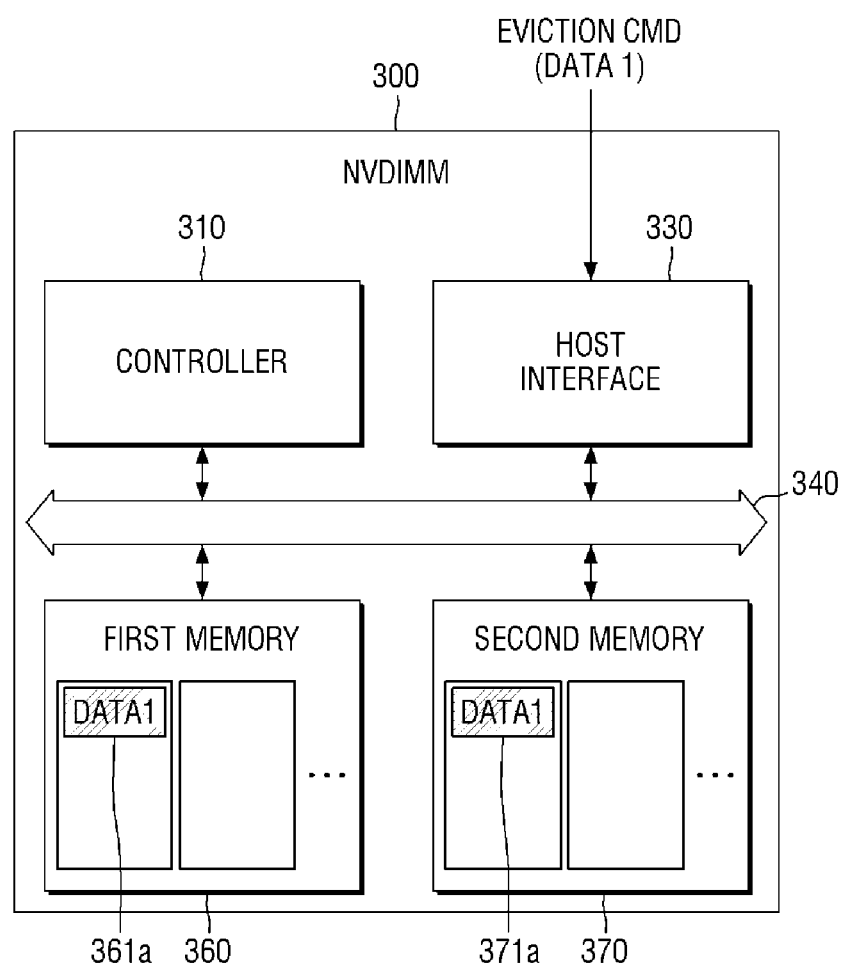
FIG. 15 is a view of an example of a method of evicting data stored in an NVDIMM in a computing device according to some embodiments of the present disclosure.

For example, referring to FIG. 15, the controller 310 may receive an eviction command for the first data data1 through the host interface 330. When the eviction command for the first data data1 is received, the controller 310 may check the management map and obtain information about the first data data1 corresponding to the eviction command.

Referring back to FIG. 14, the NVDIMM 300 may check the management map (S230) and recognize whether data associated with the eviction command stored in the first memory 360 is changed (S240).

When it is recognized that the data associated with the eviction command stored in the first memory 360 is not changed (N in S240), the NVDIMM 300 may change a storage space in which the data associated with the eviction command is stored from a storage space of the first memory 360 into an available space (S270).

For example, referring back to FIG. 15, the controller 310 of the NVDIMM 300 may check the above-described management map and confirm whether the first data data1 associated with the eviction command stored in the second storage space 361a of the first memory 360 is changed differently from the first data data1 associated with the eviction command stored in the first storage space 371a of the second memory 370.

When the controller 310 recognizes that the first data data1 stored in the first memory 360 is not changed, the controller 310 may not store the first data data1, which is stored in the second storage space 361a, in the second memory 370.

Figure 16:
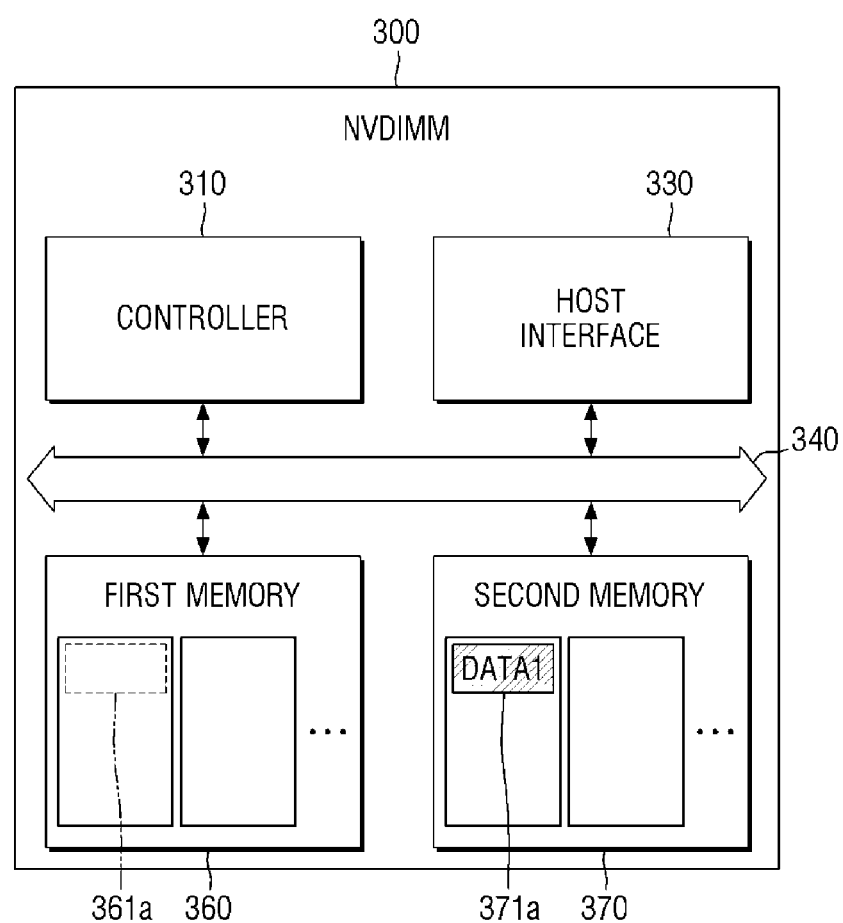
FIG. 16 is a view of an example of a method of evicting data stored in an NVDIMM in a computing device according to some embodiments of the present disclosure.

Referring to FIG. 16, when the controller 310 recognizes that the first data data1 stored in the first memory 360 is not changed, the controller 310 may change the second storage space 361a of the first memory 360 in which the first data data1 is stored into an available space.

Referring back to FIG. 14, when the NVDIMM 300 recognizes that data associated with the eviction command stored in the first memory 360 is changed (Y in S240), the NVDIMM 300 may evict the data associated with the eviction command stored in the first memory 360 and store the data in the second memory 370 (S250).

After evicting and storing the data in the second memory 370, the NVDIMM 300 may change a storage space of the first memory 360 in which the data associated with the eviction command is stored into an available space (S270).

Figure 17:
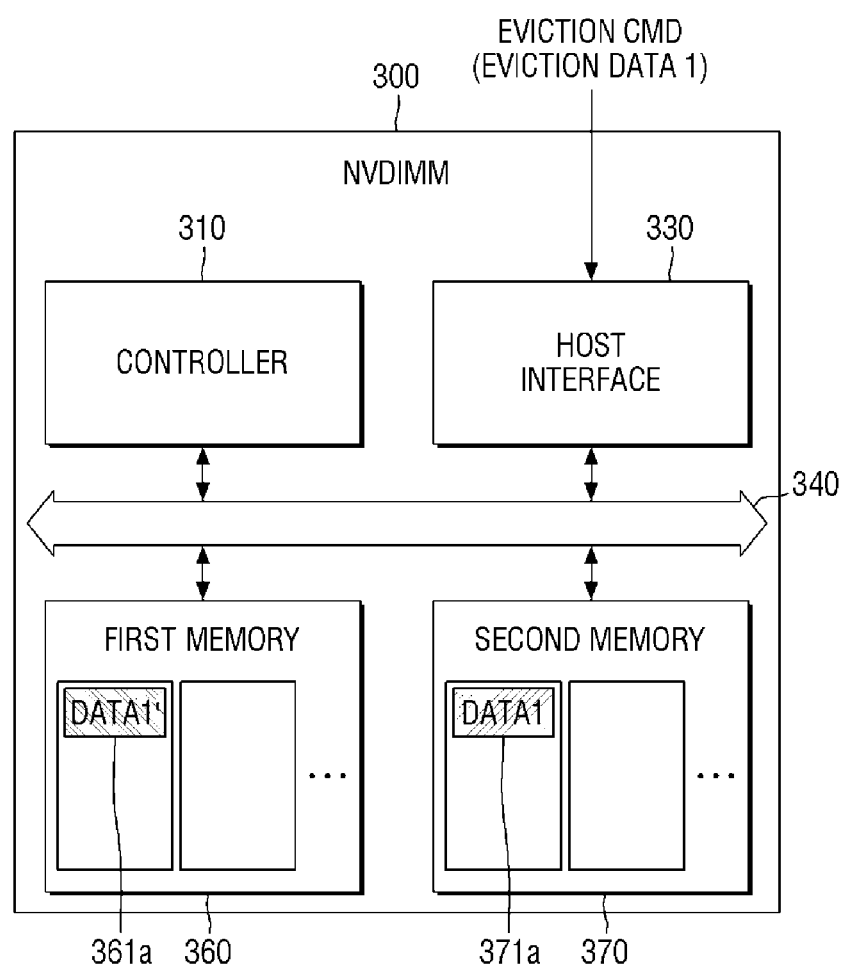
FIG. 17 is a view of an example of a method of evicting data stored in an NVDIMM in a computing device according to some embodiments of the present disclosure.

For example, referring to FIG. 17, the controller 310 may receive an eviction command for the first data data1 through the host interface 330.

When the eviction command for the first data data1 is received, the controller 310 may check information about the first data data1 corresponding to the eviction command via the management map. The controller 310 may check the management map and recognize whether the first data data1 is changed. Here, the first data data1 may be data stored in the first memory 360.

Figure 18:
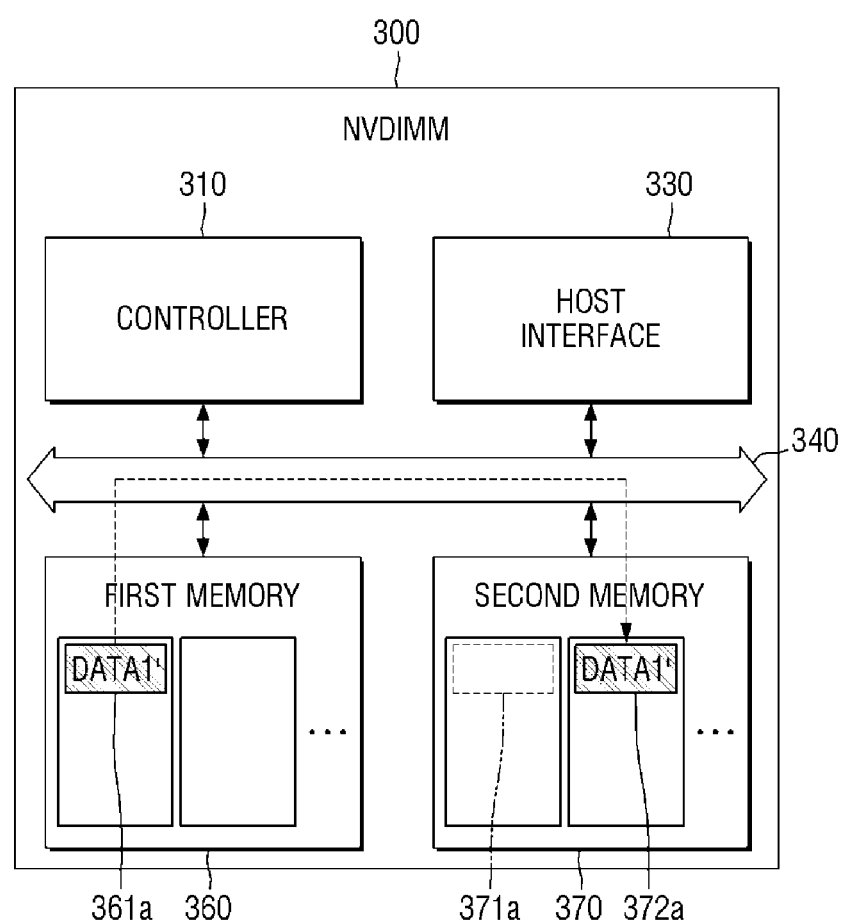
FIG. 18 is a view of an example of a method of evicting data stored in an NVDIMM in a computing device according to some embodiments of the present disclosure.

Referring to FIG. 18, when the controller 310 recognizes that the first data data1 is changed, the controller 310 may evict or store the modified data data1' associated with the eviction command, which is stored in the second storage space 361a, in the existing first storage space 371a in which the unmodified first data data1 is stored or a fourth storage space 372a in the second memory 370. In this case, when the storage space is changed, the unmodified first data data1, which is stored in the first storage space 371a, may be deleted. Further, when the data storage space is changed, the controller 310 may update information indicating that a storage space of the first data data1 is the fourth storage space 372a.

Figure 19:
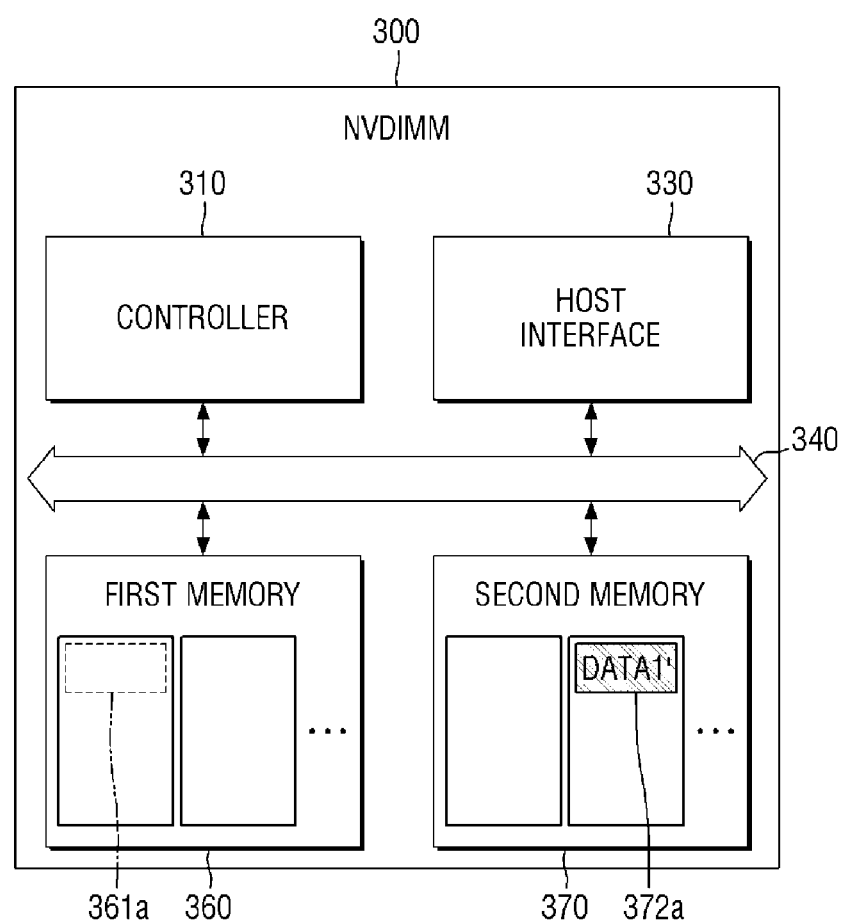
FIG. 19 is a view of an example of a method of evicting data stored in an NVDIMM in a computing device according to some embodiments of the present disclosure.

Referring to FIG. 19, after evicting and storing the modified first data data1' in the fourth storage space 372a of the second memory 370, the controller 310 may change the second storage space 361a of the first memory 360 in which data associated with the eviction command is stored into an available space.

According to the above-described embodiments, only necessary data may be always left in the first memory 360, which is a high-speed and small-capacity memory.

On the other hand, referring back to FIG. 14, when eviction of data associated with the eviction command is completed, the NVDIMM 300 may transmit a signal indicating the completion of the eviction through the host interface 330 to the processor 100. The processor 100 may receive the signal and recognize that the eviction of the data is completed.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A computing device comprising:
   a processor; and
   a non-volatile dual in-line memory module (NVDIMM) connected to the processor, wherein the NVDIMM comprises:
      a first memory having a first processing speed and a first storage capacity,
      a second memory having a second processing speed lower than the first processing speed and a second storage capacity larger than the first storage capacity,
      a controller that evicts or fetches data between the first memory and the second memory, and
      a host interface, wherein
   in response to recognizing a first situation to evict data or a second situation to prefetch data, the processor transmits a command including first information of a logical address of data associated with the first situation or the second situation, second information of a length of the data associated with the first situation or the second situation, and third information indicating the first situation or the second situation to the NVDIMM.

2. The computing device of claim 1, wherein in response to recognizing the first situation for first data, the processor transmits a first command including information of a logical address of the first data, information of a length of the first data, and information indicating the first situation for first data to the NVDIMM.

3. The computing device of claim 2, wherein in response to receiving the first command through the host interface, the controller checks a management map and checks whether the first data is changed.

4. The computing device of claim 3, wherein:
   the first data is stored in a first storage space of the first memory, and
   in response to recognizing that the first data is changed, the controller evicts the changed first data from the first memory and stores the changed first data in a second storage space of the second memory.

5. The computing device of claim 4, wherein the controller changes the first storage space into an available space.

6. The computing device of claim 4, wherein in response to recognizing that the first data is not changed, the controller neither evicts the first data from the first memory nor stores the first data in the second memory.

7. The computing device of claim 6, wherein the controller changes the first storage space into an available space.

8. The computing device of claim 1, wherein in response to recognizing the second situation for second data, the processor transmits a second command including information of a logical address of the second data, information of a length of the second data, and information indicating the second situation for the second data to the NVDIMM.

9. The computing device of claim 8, wherein in response to receiving the second command through the host interface, the controller fetches the second data stored in a first storage space of the second memory and stores the second data in a second storage space included in the first memory.

10. The computing device of claim 1, wherein the processor intercepts a system call.

11. The computing device of claim 10, wherein in response to the system call being a command associated with the first situation, the processor changes the system call into a data eviction command.

12. The computing device of claim 10, wherein in response to the system call being a command associated with the second situation, the processor changes the system call into a data prefetch command.

13. A non-volatile dual in-line memory module (NVDIMM) comprising:
   a first memory having a first processing speed, a first storage capacity, and a first storage space in which first data is stored;
   a second memory having a second processing speed lower than the first processing speed, a second storage capacity larger than the first storage capacity, and a second storage space in which second data corresponding to the first data is stored;
   a controller that evicts or fetches data between the first memory and the second memory; and
   a host interface, wherein
   in response to receiving a first command including first information of a logical address of the first data, second information of a length of the first data, and third information indicating a first situation to evict data through the host interface, the controller checks a management map and checks whether the first data is changed.

14. The NVDIMM of claim 13, wherein:
   in response to recognizing that the first data is changed, the controller evicts the first data from the first memory and stores the first data in the second storage space or a third storage space, which is different from the second storage space, in the second memory, and
   in response to storing the first data in the third storage space, the controller updates information regarding the second storage space of the second data.

15. The NVDIMM of claim 14, wherein the controller changes the first storage space into an available space.

16. The NVDIMM of claim 13, wherein in response to recognizing that the first data is not changed, the controller neither evicts the first data from the first memory nor stores the first data in the second memory.

17. The NVDIMM of claim 16, wherein the controller changes the second storage space into an available space.

18. A non-volatile dual in-line memory module (NVDIMM) comprising:
   a first memory having a first processing speed and a first storage capacity;
   a second memory having a second processing speed lower than the first processing speed, a second storage capacity larger than the first storage capacity, and a first storage space in which first data is stored;
   a controller that evicts or fetches data between the first memory and the second memory; and
   a host interface, wherein
   in response to receiving a first command including first information of a logical address of the first data, second information of a length of the first data, and third information indicating a first situation to prefetch the first data through the host interface, the controller fetches the first data from the first storage space of the second memory and stores the first data in a second storage space within the first memory.

19. The NVDIMM of claim 18, wherein in response to receiving a second command for reading the first data through the host interface, the controller transmits the first data stored in the second storage space through the host interface.

20. The NVDIMM of claim 18, wherein in response to receiving a third command for modifying the first data through the host interface, the controller modifies the first data stored in the first memory.

* * * * *